United States Patent Office 3,819,738
Patented June 25, 1974

3,819,738
ALKYNES REMOVAL FROM HYDROCARBON STREAMS
Darryl R. Fahey and Donald H. Kubicek, Bartlesville, Okla., assignors to Phillips Petroleum Company
No Drawing. Filed Sept. 25, 1972, Ser. No. 291,614
Int. Cl. C07c 11/00
U.S. Cl. 260—677 A                10 Claims

ABSTRACT OF THE DISCLOSURE

A method of removing alkynes from hydrocarbon streams which involves passing the hydrocarbon stream into contact with a base-treated, molybdenum-promoted or tungsten-promoted alumina or silica to convert the alkynes to higher molecular weight compounds.

---

This invention relates to the removal of alkynes from hydrocarbon-containing streams.

In one of its more specific aspects, this invention relates to the employment of base-treated molybdena-alumina catalysts for acetylene removal from ethylene-containing streams.

The presence of alkynes, and particularly of acetylene, in hydrocarbon-containing streams is well known. There has now been developed a method of reducing the alkynes content of hydrocarbon streams by employing an inexpensive catalyst in a simple process. This invention provides that method.

According to this invention there is provided a method for reducing the alkyne content of hydrocarbon streams which comprises passing the hydrocarbon stream into contact with a base-treated molybdenum oxide-promoted or tungsten oxide-promoted alumina or silica under conditions to convert the alknes to compounds having a molecular weight greater than that of the alkynes. The compounds so formed are then separated from the hydrocarbon stream.

The method of this invention is applicable to the removal of alkynes having from 2 to 20 carbon atoms from a wide variety of hydrocarbon streams and particularly to the removal of alkynes from ethylene-containing streams in which there is no significant quantity of olefins having more than two carbon atoms per molecule. The hydrocarbon stream can comprise paraffins, cycloparaffins and aromatics in which the alkyne to be removed is contained in a concentration within the range of from about 1 to about 70 weight percent.

The invention is carried out by passing the alkyne-containing hydrocarbon stream into contact with base-treated catalyst comprising an oxide of aluminum or silicon promoted by molybdenum or tungsten usually considered to be present in the form of an oxide. Cobalt oxide can be present in the molybdenum-promoted catalysts in an amount up to about 20 weight percent, preferably from about 1 to about 5 weight percent.

Generally, the catalyst will contain from 0.1 to 30 percent by weight of the molybdenum or tungsten promoter, calculated as the trioxide. The promoter can be added to the alumina or silica in the form of its oxide or in forms convertible to the oxide upon calcination. Addition of the tungsten, cobalt or molybdenum compound to the alumina or silica can be carried out by conventional methods including dry mixing, coprecipitation and solution impregnation.

The composition formed by the above procedure is then treated with an inorganic base such as sodium hydroxide, potassium hydroxide and the like to deactivate any acid sites present in the composition. The inorganic base will be employed in an amount within the range of from 0.01 to about 10 weight percent of the composition and preferably from 0.1 to 3 weight percent.

Thereafter, the base-treated composition is calcined by conventional methods which involves heating in air at temperatures of from about 540° to 600° C. The catalyst formed thereupon is maintained in the absence of air and can be employed in any suitable form. Preferably, the catalyst will comprise a potassium hydroxide treated molybdena-alumina catalyst in the form of pellets.

The hydrocarbon stream is passed into contact with the catalyst at a temperature within the range of about 65° to about 260° C. at any convenient pressure at a space velocity within the range of from about 0.1 to 200 volumes of hydrocarbon vapor per volume of catalyst per hour and the hydrocarbon stream is thereafter subjected to suitable procedures to separate the materials formed upon the catalytic contact from the hydrocarbon stream.

The catalyst can be regenerated by conventional procedures in which the catalyst is contacted at elevated temperatures with a free oxygen-containing stream under conditions which burn carbonaceous accumulations from the catalyst. The catalyst can be thereafter reused.

The method of preparing the catalyst is illustrated by the following.

EXAMPLE I

A commercially-available molybdena-alumina composition containing about 12.6 weight percent molybdenum oxide and about 87.2 weight percent aluminum oxide, a surface area of about 220 m.$^2$/g. and a pore volume of about 0.63 cm.$^3$/g. was contacted for one hour with an aqueous solution containing 2.0 weight percent potassium hydroxide. The base-treated catalyst composition was thereafter washed with distilled water and activated in air at 530° C. for five hours to produce that catalyst employed in the following examples.

EXAMPLE II

A portion of that catalyst prepared in Example I was contacted with a gaseous stream containing 42.1 weight percent ethylene and 57.9 weight percent acetylene. Contact was made at 130° C., atmospheric pressure and a rate of 2.4 volumes of vaporous feedstream per volume of catalyst per hour.

The effluent from the contact contained 10.48 weight percent acetylene after 0.25 hours on stream, the acetylene concentration in the effluent reducing continuously to a minimum of 0.07 weight percent after two hours on stream.

After a period of 3.5 hours on stream, the acetylene content of the effluent had increased to 0.28 weight percent, and the catalyst was thereupon regenerated by the following procedure.

EXAMPLE III

The catalyst from Example II was regenerated by contact with air at 540–600° C. for two hours.

The catalyst was returned to service and found to be regenerated.

EXAMPLE IV

The following runs indicate the operation of the method of this invention when employing a feedstream containing 94.26 weight percent ethylene, 1.18 weight percent acetylene and 4.56 weight percent methane.

| | Temperature, ° C. | Space velocity, vol./vol./hr. | Run duration, hrs. | Ethylene recovery, percent |
|---|---|---|---|---|
| Run number: | | | | |
| 1 | 130 | 6 | 1.5 | 86.5 |
| 2 | 108 | 2.4 | 3 | 97.2 |
| 3 | 99–100 | 2.4 | 3 | 101.2 |

In Runs 1 and 2, the acetylene content in the effluent was less than 200 p.p.m. and in Run 3, the acetylene content was about 200 p.p.m.

These results demonstrate that the method of this invention provides high ethylene recovery with simultaneously high acetylene removal.

It will be evident from the foregoing that various modifications can be made to the method of this invention. Such are considered, however, to be within the scope of the invention.

What is claimed is:

1. A method of removing alkynes from a feedstream comprising alkynes which comprises contacting the feedstream with a supported catalyst comprising an oxide of aluminum or silicon and an oxide of molybdenum or tungsten, said catalyst having been contacted with an inorganic base, under conditions to convert said alkynes to compounds having a molecular weight greater than said alkynes and recovering said feedstream.

2. The method of claim 1 in which said catalyst comprises molybdena-alumina.

3. The method claim 1 in which feedstream is passed into contact with said catalyst at a temperature within the range of about 65° to about 260° C. at a space velocity within the range of from about 0.1 to about 200 volumes of said feedstream per volume of said catalyst per hour.

4. The method of claim 2 in which said feedstream is passed into contact with said catalyst at a temperature within the range of about 65° to about 260° C. at a space velocity within the range of from about 0.1 to about 200 volumes of said feedstream per volume of said catalyst per hour.

5. The method of claim 1 in which said catalyst comprises potassium hydroxide-treated molybdena-alumina.

6. The method of claim 2 in which said alkynes comprise acetylene and said feedstream comprises ethylene.

7. The method of claim 4 in which said catalyst is activated by calcination.

8. The method of claim 2 in whch said catalyst comprises cobalt oxide.

9. The method of claim 8 in which said cobalt oxide is present in an amount up to about 20 weight percent of said catalyst.

10. The method of claim 1 in which said catalyst is base treated by contacting said catalyst with an inorganic base selected from the group consisting of sodium hydroxide and potassium hydroxide.

References Cited
UNITED STATES PATENTS

| | | | |
|---|---|---|---|
| 3,205,281 | 9/1965 | Fleming et al. | 260—677 A |
| 2,378,969 | 6/1945 | Bailey et al. | 260—677 |
| 2,775,634 | 12/1956 | Nowlin | 260—677 |
| 3,003,008 | 9/1961 | Fleming et al. | 260—677 H |
| 2,939,892 | 6/1960 | Gardner et al. | 260—677 |
| 2,814,653 | 11/1957 | Hogan et al. | 260—677 H |
| 2,548,619 | 4/1951 | Ray | 260—677 A |

DELBERT E. GANTZ, Primary Examiner

J. M. NELSON, Assistant Examiner